(12) United States Patent
Breuer et al.

(10) Patent No.: US 8,121,606 B2
(45) Date of Patent: Feb. 21, 2012

(54) RADIO RESOURCE MANAGEMENT IN A MOBILE RADIO COMMUNICATION SYSTEM

(75) Inventors: Volker Breuer, Bötzow (DE); Thomas Ulrich, Bad Dürkheim (DE); Ingo Viering, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 660 days.

(21) Appl. No.: 12/226,954

(22) PCT Filed: Apr. 26, 2007

(86) PCT No.: PCT/EP2007/054113
§ 371 (c)(1),
(2), (4) Date: Feb. 12, 2009

(87) PCT Pub. No.: WO2007/125079
PCT Pub. Date: Nov. 8, 2007

(65) Prior Publication Data
US 2009/0221294 A1   Sep. 3, 2009

(30) Foreign Application Priority Data

May 3, 2006   (EP) .................................... 06009177

(51) Int. Cl.
*H04W 72/00* (2009.01)
(52) U.S. Cl. ...................... 455/450; 455/452.2; 455/453
(58) Field of Classification Search ............... 455/422.1, 455/450–453, 456.2, 464, 509, 510; 370/395.41, 370/332; 375/E7.141
See application file for complete search history.

(56) References Cited

U.S. PATENT DOCUMENTS

| | | | | |
|---|---|---|---|---|
| 5,603,085 A | * | 2/1997 | Shedlo | 455/450 |
| 7,107,341 B2 | * | 9/2006 | Mousseau et al. | 709/224 |
| 8,018,893 B2 | * | 9/2011 | Sartori et al. | 370/329 |
| 2002/0183066 A1 | * | 12/2002 | Pankaj | 455/453 |
| 2005/0221795 A1 | * | 10/2005 | Hirabe et al. | 455/409 |
| 2006/0039381 A1 | * | 2/2006 | Anschutz et al. | 370/395.21 |

(Continued)

FOREIGN PATENT DOCUMENTS

| | | |
|---|---|---|
| CN | 1510948 | 7/2004 |
| CN | 1631003 | 6/2005 |
| WO | 02/087163 A2 | 10/2002 |
| WO | 2005/020613 A2 | 3/2005 |

OTHER PUBLICATIONS

IEEE 802.11, "Information technology—Telecommunications and information exchange between systems—Local and metropolitan area networks—Specific requirements—Part 11: Wireless LAN Medium Access Control (MAC) and Physical Layer (PHY) Specifications"; ANSI/IEEE Std 802.11, 1999 Edition, Sponsor LAN MAN Standards Committee of the IEEE Computer Society.

*Primary Examiner* — Dominic E Rego
(74) *Attorney, Agent, or Firm* — Staas & Halsey LLP

(57) ABSTRACT

A method operates a radio communication system in which network radio devices use radio resources in order to communicate with subscriber stations. A first network radio device performs direct tuning with a second network radio device using the respectively used radio resources. The first and/or the second network radio device send(s) a request for a decision about radio resources to be used by the first and/or the second network radio device to a device. Subsequent to the request, the first and/or the second network radio device receive(s) information from the device about radio resources to be used by the first and/or the second network radio device. A radio communication system carries out the method.

17 Claims, 1 Drawing Sheet

U.S. PATENT DOCUMENTS

| | | | |
|---|---|---|---|
| 2007/0070898 A1* | 3/2007 | Khrais | 370/230 |
| 2007/0195731 A1* | 8/2007 | Camp, Jr. | 370/329 |
| 2007/0249361 A1* | 10/2007 | Klang et al. | 455/452.2 |
| 2007/0255839 A1* | 11/2007 | Chang et al. | 709/229 |
| 2009/0117933 A1* | 5/2009 | Umesh et al. | 455/522 |
| 2009/0129305 A1* | 5/2009 | Malkamaki | 370/311 |
| 2009/0303940 A1* | 12/2009 | Barbaresi et al. | 370/329 |

* cited by examiner

RADIO RESOURCE MANAGEMENT IN A MOBILE RADIO COMMUNICATION SYSTEM

CROSS REFERENCE TO RELATED APPLICATIONS

This application is based on and hereby claims priority to Application No. EP06009177 filed on May 3, 2006 and International Application Number PCT/EP2007/054113, filed on Apr. 26, 2007, the contents of which are hereby incorporated by reference.

BACKGROUND OF THE INVENTION

The invention relates to a method for operating a radio communication system, in which network radio devices use radio resources to communicate with subscriber stations.

In radio communication systems, messages, for example with voice information, image information, video information, SMS (Short Message Service), MMS (Multimedia Messaging Service) or other data, are transmitted between a transmitting station and a receiving station over a radio interface using electromagnetic waves. The stations may be here, depending on the specific configuration of the radio communication system, various types of subscriber stations or network radio devices such as repeaters, radio access points or base stations. A mobile radio communication system is composed of mobile radio stations, at least in the case of some of the subscriber stations. Irradiation of the electromagnetic waves is carried out with carrier frequencies which are in the frequency band which is provided for the respective system.

Mobile radio communication systems are often embodied as cellular systems, for example according to the GSM (Global System for Mobile Communication) standard or UMTS (Universal Mobile Telecommunications System) standard, with a network infrastructure composed, for example, of base stations, devices for monitoring and controlling the base stations and further network devices. Apart from these (supralocal) cellular, hierarchical radio networks which are organized over large areas there are also wireless local networks (WLANs, Wireless Local Area Networks) with a generally spatially significantly more strictly limited radio coverage area. Examples of different standards for WLANs are Hiper-LAN, DECT, IEEE 802.11, Bluetooth and WATM.

The access of subscriber stations to the common transmission medium is regulated by multiple access methods/multiplex methods (MA) in radio communication systems. In these multiple access operations, the radio resources can be divided in the time domain (Time Division Multiple Access, TDMA), in the frequency domain (Frequency Division Multiple Access, FDMA), in the code domain (Code Division Multiple Access, CDMA) or in the spatial domain (Space Division Multiple Access, SDMA). Combinations of multiple access methods are also possible, for example combination of a frequency domain multiple access method with a code domain multiple access method. In order to be able to achieve the most efficient radio transmission possible, the entire available frequency band can be divided into a plurality of sub-bands (multi-carrier methods). The idea on which the multi-carrier systems are based is to convert the initial problem of the transmission of a broadband signal into the transmission of a plurality of narrowband signals. An example of a multi-carrier transmission method is OFDM (Orthogonal Frequency Division Multiplexing).

SUMMARY

One potential object is to providean efficient method for operating a radio communication system and a radio communication system which is suitable for carrying out the method.

The inventors propose a method for the operation of a radio communication system. In the radio communication system, network radio devices use radio resources to communicate with subscriber stations. A first network radio device carries out direct tuning with a second network radio device in relation to the respectively used radio resources. The first network radio device and/or the second network radio device transmits a request for a decision about radio resources to be used by the first network radio device and/or radio resources to be used by the second network radio device to a device. In response to the request the first network radio device and/or the second network radio device receives, from the device, information about radio resources to be used by the first network radio device and/or radio resources to be used by the second network radio device.

The network radio devices communicate respectively with subscriber stations. This communication can respectively comprise the transmission of messages and/or the reception of messages by the respective network radio device. For communication with the subscriber stations, the network radio devices use radio resources. These radio resources are available to the network radio devices. In this context, the radio resources which are used by a network radio device and/or are available to it do not have to be used by it continuously, but the network radio device has the possibility of using it during the time in which the radio resources are made available to it. The radio resources can be, in particular, a combination of one or more of the variables frequency, time, code and space.

The first and the second network radio devices tune themselves directly in relation to the radio resources which are respectively used by them. In the case of direct tuning in relation to the radio resources used, the network radio devices have, without the inclusion of a central, decision-making entity, the authority to make decisions about the apportionment of radio resources between the network radio devices. Within the scope of such tuning, it is, for example, possible for a network radio device to inform the others as to which radio resources it is currently using or which radio resources it will use. Furthermore, for example a network radio device can enquire from the other network radio device whether it may use radio resources which the other network radio device is currently using.

In addition to the decentralized direct tuning, the inclusion of a device as a central entity occurs. This central entity can be contacted by the first and/or the second network radio device. In response to this request, the device transmits information as to which radio resources are to be used by the first network radio device and/or the second network radio device to one or to both of the network radio devices. This information is complied with in the future use of radio resources by the network radio devices. The information therefore supplements the direct tuning between the network radio devices. This is advantageous insofar as the device may have information which is not available to the network radio devices so that the device may be able to make a more efficient decision about the apportionment of the radio resources.

The explained method can also be applied to more than two network radio devices which have been tuned directly in relation to the use of radio resources.

In one development of the method, the request is transmitted in the case of a conflict in respect of a decision about radio resources to be used by the first network radio device and/or radio resources to be used by the second network radio device within the scope of the direct tuning. The device can therefore function as an arbitrator if, for example, a solution is not found in a specific time during the direct tuning or if the same problem occurs repeatedly, or the solution which is arrived at is not satisfactory for one or both of the network radio devices.

It is advantageous if the request is transmitted when it is impossible to make the decision about radio resources to be used by the first network radio device and/or radio resources to be used by the second network radio device within the scope of the direct tuning. Such an impossibility can result, for example, if the two network radio devices use, during their direct tuning, specific rules which assign radio resources to the network radio devices as a function of specific requirements of the network radio devices, and these rules cannot be used to make an assignment given the current requirements of the network radio devices.

In one development of the method, the request is transmitted in the case of fluctuating decisions about radio resources to be used by the first network radio device and/or radio resources to be used by the second network radio device within the scope of the direct tuning. Fluctuating decisions mean that a stable state of the assignment of radio resources to network radio devices has not been found and that instead the system is changing repeatedly in rapid succession between two or more states.

It is particularly advantageous if, owing to the direct tuning, the first network radio device makes exclusive use of different radio resources than those used by the second network radio device. An objective of the direct tuning is in this case to avoid the first and second network radio devices using the same radio resources or overlapping radio resources. The latter would be the case, for example, if the two network radio devices use the same frequency at the same time in overlapping spatial areas.

In one refinement of the method, the device uses the information to carry out re-allocation of radio resources to be used by the first network radio device and/or of radio resources to be used by the second network radio device. If the information of the device is complied with, the radio resources used by the first and/or second network radio devices change.

It is possible that the first network radio device and/or the second network radio device receives, in addition to the reception of the requested information, unrequested information from the device about radio resources to be used by the first network radio device and/or radio resources to be used by the second network radio device. In this way, the device can be activated even without a request by the network radio devices by virtue of the fact that the device prescribes the radio resources to be used by the first and/or second network radio device. This procedure is particularly suitable for exceptional situations such as, for example, emergency situations owing to accidents.

The radio resources preferably comprise combinations of subbands of a frequency band with time segments. This is particularly suitable for OFDM systems.

The inventors also propose a radio communication system in which network radio devices use radio resources to communicate with subscriber stations. A first network radio device and a second network radio device are present which carry out direct tuning with one another in relation to the respectively used radio resources. The first network radio device and/or the second network radio device comprise a transmitter for transmitting a request for a decision about radio resources to be used by the first network radio device and/or radio resources to be used by the second network radio device to a device. The device comprises a decision unit for deciding about radio resources to be used by the first network radio device and/or radio resources to be used by the second network radio device, and for transmitting information about radio resources to be used by the first network radio device and/or radio resources to be used by the second network radio device to the first network radio device and/or the second network radio device.

The radio communication system is suitable, in particular, for carrying out the proposed method, and this can also be applied to the refinements and developments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
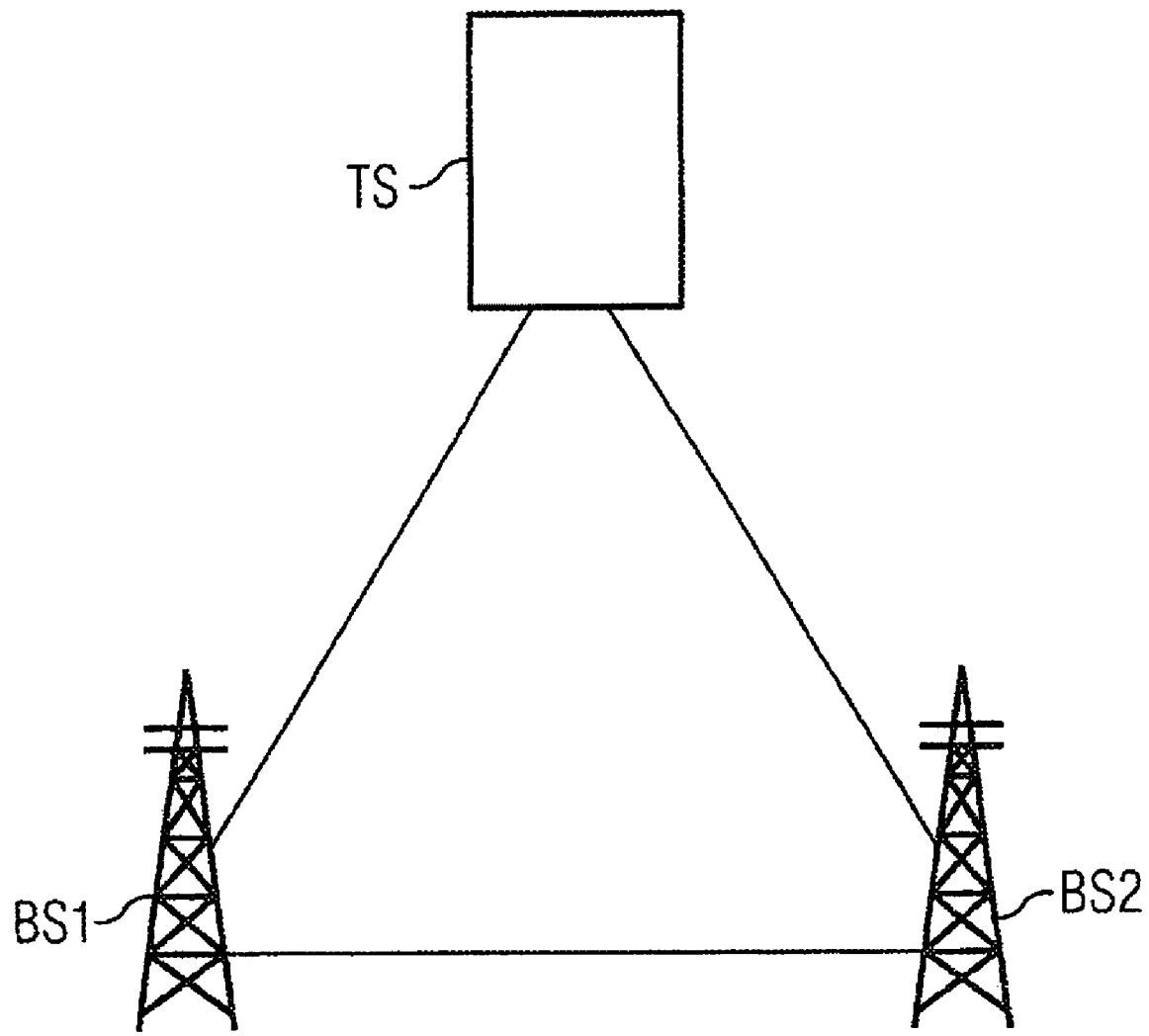
FIG. 1 shows a detail of a mobile radio communication system.

Reference will now be made in detail to the preferred embodiments of the present invention, examples of which are illustrated in the accompanying drawings, wherein like reference numerals refer to like elements throughout.

The detail of a mobile radio communication system illustrated in FIG. 1 comprises the two network radio devices BS1 and BS2. These are connected to one another, and the connection here can be implemented by a line and/or by radio; the connection is preferably an IP (Internet Protocol) connection. Furthermore, the two network radio devices BS1 and BS2 are connected to the device TS whose function will be explained in more detail below. The connections between the device TS and the network radio devices BS1 and BS2 can also be implemented by a line and/or by radio. Both the connection between the two network radio devices BS1 and BS2 and that between the network radio devices BS1 and BS2 and the device TS can run via other nodes.

The network radio devices BS1 and BS2 communicate, in their respective radio coverage zones, with subscriber stations (not illustrated in FIG. 1). The network radio devices BS1 and BS2 are adjacent network radio devices, i.e. the radio coverage zones of the network radio devices BS1 and BS2 adjoin one another. Further network radio devices and other devices of the mobile radio communication system are not included in FIG. 1 for the sake of simplification. The mobile radio communication system is preferably a cellular system with area-covering radio coverage.

The network radio devices BS1 and BS2 use radio resources to communicate with subscriber stations. A radio resource unit may be, for example in an OFDM system, the combination of a subband and a time segment, if appropriate also in combination with a spatial direction component. If the network radio devices BS1 and BS2 use the same radio resources at the same time, this leads to interference between the signals which are irradiated in the adjacent radio coverage zones. When there is strong interference, the signals can no longer be decoded. In order to avoid this undesired situation, an attempt is made within the scope of the RRM (Radio Resource Management) system to apportion the radio resources among the network radio devices in such a way that overlaps are very largely avoided. In addition to the purpose of reducing interference, the RRM also serves, inter alia, the objectives of load balancing, i.e. of balancing the traffic load between various network radio devices, supporting the subscriber prioritization and permitting efficient handover processes between adjacent network radio devices.

Decentralized tuning in relation to the radio resources which are used between the network radio devices BS1 and BS2 takes place. The use of radio resources by a network radio device means that this network radio device is authorized to use the radio resources in its radio cell for downlink and/or uplink message transmissions, i.e. for message transmissions from the network radio device to subscriber stations and from subscriber stations to the network radio device, respectively.

Within the scope of this tuning, a network radio device BS1 or BS2 can, for example, inform the other network radio device BS1 or BS2 that it uses specific radio resources, in response to which the other network radio device BS1 or BS2 does not use these radio resources. The information can concern already implemented decisions and decisions which are to be implemented in future. A request by one network radio device BS1 or BS2 to the other network radio device BS1 or BS2 to release radio resources can also be issued, and the other network radio device BS1 or BS2 can comply with said request or reject it. The network radio devices BS1 and BS2 can also exchange measurement results in order to apportion the radio resources advantageously.

The two network radio devices BS1 and BS2 preferably observe certain rules during their tuning. For example, it is possible for there to be a rule that a network radio station can preferably use radio resources if subscriber stations of a specific category, for example subscriber stations with real-time requests, would like to communicate with it.

The use of the radio resources can be adapted in a flexible way to the actual demand by virtue of the decentralized tuning in relation to the use of the radio resources. Since no further entity is involved in this apart from the network radio devices BS1 and BS2 which are directly affected, re-apportionment can quickly be carried out so that as a result few delays are incurred. A central device is not required for this, which saves costs and simplifies the architecture of the system.

However, it is possible for conflict situations to occur during the decentralized tuning, during which conflict situations apportionment according to the tuning rules used by the network radio devices BS1 and BS2 is not arrived at. This applies, in particular, to situations in which both network radio devices BS1 and BS2 experience a high traffic load. If, for example, the network radio device BS1 takes up 60% of the radio resources, while the network radio device BS2 takes up 70% of the radio resources, and no other criteria are available which permit a decision to be made about the type of apportionment of the radio resources, the rules which are available to the network radio devices BS1 and BS2 are not sufficient for a decision to be made about the apportionment which is to be carried out.

In situations in which the rules permit apportionment to be arrived at, it can also be unstable. This is because the RRM of each of the two network radio devices BS1 and BS2 can be considered to be a control loop which has external influences and which can easily become unstable. This may occur, for example, due to oscillations.

In order to ensure that the network radio devices BS1 and BS2 can determine an apportionment of the radio resources in any situation and/or can determine a stable apportionment, a large number of complex rules would have to be defined. As a result, the tuning between the network radio devices BS1 and BS2 would become complex. This would become all the more complicated if allowance is made for the fact that a network radio device generally not only has one network radio device but rather a plurality of adjacent network radio devices with which tuning has to be carried out in relation to the radio resources to be used.

The device TS is responsible for resolving conflicts in the apportionment of the radio resources. Said device TS is contacted by one or both of the network radio devices BS1 and BS2 when one or both of said network radio devices BS1 and BS2 considers/consider that there is a need for a decision by the device TS. The device TS decides, as it were like an "arbitrator", which radio resources may respectively use the two network radio devices BS1 and BS2. It is possible that only the situation of the two network radio devices BS1 and BS2 will be included in this decision or else that further network radio devices will be taken into account. It is therefore possible, for example, for the device TS to decide that radio resources are to be released by a further network radio device and may be used by the network radio device BS1, while the radio resources which are used by the network radio device BS2 remain the same. Owing to the use of relatively complex decision rules by the device TS and owing to the availability of a greater amount of information at the device TS than at the network radio devices BS1 and BS2, it is possible for the device TS to make better decisions about the apportionment of the radio resources than is possible for the network radio devices BS1 and BS2.

The device TS can be implemented as a stand-alone device. The functionality of the device TS can, however, also be integrated into a device which is used for other purposes, for example into an "Access Gateway". The device TS can have a connection to the O&M (Operation & Maintenance) system so that O&M settings can be transmitted to the network radio devices BS1 and BS2 via the device TS.

The device TS tells the network radio devices BS1 and BS2 which radio resources are to be used subsequently. This apportionment can be changed at a later time by decentralized tuning between the network radio devices BS1 and BS2.

The frequency with which the device TS is contacted by the network radio devices BS1 and BS2 depends on the complexity of the RRM mechanisms which are implemented in the network radio devices BS1 and BS2. These RRM mechanisms should be of such a complexity that the case in which the device TS intervenes or its assistance is called upon constitutes the exception, while the decentralized RRM by the direct tuning is the rule.

In addition to the use of the device TS in conflict situations as already explained, there can be specific situations in which centralized RRM is necessary. It is therefore advantageous, for example, that in emergency situations specific subscribers make available radio resources to a greater degree in contrast with the customary subscriber prioritization. Doctors or other rescue service personnel in the case of accidents are an example of this.

Furthermore, the device TS can perform coarse apportionment of the radio resources, on the basis of which the network radio devices BS1 and BS2 carry out the decentralized apportionment. This coarse apportionment can be carried out repeatedly and change over time. If, for example, the network radio devices BS1 and BS2 are supposed to divide approximately in half a pool of radio resources on the basis of their radio traffic volume, but the network radio device BS1 uses 80% of the resources of this pool, it is possible for the device TS to arrange an apportionment in such a way that 80% of the resources are made available to the network radio device BS2. This apportionment is the apportionment which is based on new direct tuning between the network radio devices BS1 and BS2. In this way, the tuning between the network radio devices BS1 and BS2 can be speeded up.

While the method has been explained with reference to two network radio devices, it can be applied to a larger number of network radio devices. The direct tuning between said network radio devices can be respectively carried out in pairs in combination with the assistance by the device TS. Furthermore, it is possible for direct tuning to occur between three or more network radio devices, said tuning being supplemented in the way described by instructions from the device TS which are requested by the network radio devices.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. DIRECTV, 69 USPQ2d 1865 (Fed. Cir. 2004).

The invention claimed is:

1. A method for operating a radio communication system, in which network radio devices use radio resources to communicate with respective subscriber stations, comprising:
    performing direct tuning at a first network radio device and at a second network radio device such that the first and second network radio devices communicate directly with each other and each selects the radio resources they will be used for communicating with their respective subscriber stations;
    transmitting a request from the first network radio device to an intermediate device, the request inquiring about changing the radio resources to be used by the first network radio; and
    receiving a decision from the intermediate device in response to the request, the decision being received at the first network radio device, the decision containing information about the radio resources to be used by the first network radio device.

2. The method as claimed in claim 1, wherein the request is transmitted if there is a conflict with respect to the radio resources used by the first network radio device and the second network radio device within the scope of direct tuning.

3. The method as claimed in claim 2, wherein the request is transmitted when it is impossible to make a decision about which radio resources will be used by the first network radio device and/or the second network radio device within the scope of the direct tuning.

4. The method as claimed in claim 3, wherein with direct tuning, the first network radio device uses different radio resources from those used by the second network radio device.

5. The method as claimed in claim 4, wherein the intermediate device uses the information to carry out re-allocation of radio resources to be used by the second network radio device.

6. The method as claimed in claim 5, wherein the first network radio device receives, in addition to the response requested, unrequested information from the intermediate device about radio resources to be used by the first network radio device and/or radio resources to be used by the second network radio device.

7. The method as claimed in claim 6, wherein the radio resources comprise combinations of subbands of a frequency band with time segments.

8. The method as claimed in claim 1, wherein the request is transmitted in the case of fluctuating decisions about radio resources to be used by the first network radio device and/or the second network radio device within the scope of the direct tuning.

9. The method as claimed in claim 8, wherein with direct tuning, the first network radio device uses different radio resources from those used by the second network radio device.

10. The method as claimed in claim 9, wherein the intermediate device uses the information to carry out re-allocation of radio resources to be used by the second network radio device.

11. The method as claimed in claim 10, wherein the first network radio device receives, in addition to the response requested, unrequested information from the intermediate device about radio resources to be used by the first network radio device and/or radio resources to be used by the second network radio device.

12. The method as claimed in claim 11, wherein the radio resources comprise combinations of subbands of a frequency band with time segments.

13. The method as claimed in claim 1, wherein with direct tuning, the first network radio device uses different radio resources from those used by the second network radio device.

14. The method as claimed in claim 1, wherein the intermediate device uses the information to carry out re-allocation of radio resources to be used by the second network radio device.

15. The method as claimed in claim 1, wherein the first network radio device receives, in addition to the response requested, unrequested information from the intermediate device about radio resources to be used by the first network radio device and/or radio resources to be used by the second network radio device.

16. The method as claimed in claim 1, wherein the radio resources comprise combinations of subbands of a frequency band with time segments.

17. A radio communication system, which uses radio resources to communicate with subscriber stations, comprising:
    a first network radio device and a second network radio device which carry out direct tuning such that the first and second network radio devices communicate directly with each other and each selects the radio resources that will be used for communicating with its respective subscriber stations, the first network radio device having a transmitter to transmit a request about changing the radio resources to be used by the first network radio device; and
    an intermediate device to receive the request, to decide about radio resources to be used by the first network radio device, and to transmit a decision to the first network radio device in response the request, the decision containing information about the radio resources to be used by the first network radio device.

* * * * *

UNITED STATES PATENT AND TRADEMARK OFFICE
CERTIFICATE OF CORRECTION

| | | |
|---|---|---|
| PATENT NO. | : 8,121,606 B2 | Page 1 of 1 |
| APPLICATION NO. | : 12/226954 | |
| DATED | : February 21, 2012 | |
| INVENTOR(S) | : Volker Breuer et al. | |

It is certified that error appears in the above-identified patent and that said Letters Patent is hereby corrected as shown below:

Column 8, Line 58, In Claim 17, delete "the" and insert -- to the --, therefor.

Signed and Sealed this
Eighth Day of May, 2012

David J. Kappos
*Director of the United States Patent and Trademark Office*